United States Patent [19]

Sadkowski et al.

[11] Patent Number: 5,451,248

[45] Date of Patent: Sep. 19, 1995

[54] STORAGE AND TRANSPORTATION OF GOODS UNDER CONTROLLED ATMOSPHERES

[75] Inventors: Piotr J. Sadkowski, Ash; Michael E. Garrett, Woking, both of England; Alberto LaCava, South Plainfield, N.J.; Norberto Lemcoff, Livingston, N.J.; Dimitrios Psaras, Bound Brook, N.J.; Shigeki Hayashi, Berkeley Heights, N.J.

[73] Assignee: The BOC Group plc, Windlesham, England

[21] Appl. No.: 212,652

[22] Filed: Mar. 10, 1994

Related U.S. Application Data

[63] Continuation of Ser. No. 55,941, May 3, 1993, abandoned, which is a continuation of Ser. No. 908,759, Jul. 1, 1992, abandoned, which is a continuation of Ser. No. 731,679, Jul. 17, 1991, abandoned, which is a continuation-in-part of Ser. No. 609,948, Nov. 6, 1990, abandoned.

[30] Foreign Application Priority Data

Jul. 19, 1990 [GB] United Kingdom ............... 9015867
Dec. 11, 1990 [GB] United Kingdom ............... 9026904

[51] Int. Cl.$^6$ .............................................. B01D 53/047
[52] U.S. Cl. ................................. 95/99; 95/103; 95/105; 95/106; 95/120; 95/123; 95/130; 95/138; 95/139; 95/144; 96/128; 96/132; 96/144; 426/419
[58] Field of Search ......................... 95/96–98, 95/100–104, 119, 122, 138, 139, 143, 144; 426/418, 419; 96/131, 132, 133, 136, 143–146

[56] References Cited

U.S. PATENT DOCUMENTS

| | | | |
|---|---|---|---|
| 3,555,787 | 1/1971 | Lustig | 96/124 |
| 3,740,928 | 6/1973 | Schmid | 96/113 |
| 3,923,477 | 12/1975 | Armond et al. | 95/103 |
| 3,957,463 | 5/1976 | Drissel et al. | 95/103 |
| 3,981,698 | 9/1976 | Leppard | 95/119 |
| 4,249,915 | 2/1981 | Sircar et al. | 95/122 |
| 4,348,213 | 9/1982 | Armond | 95/103 |
| 4,554,141 | 11/1985 | Scull et al. | 95/144 |
| 4,566,282 | 1/1986 | Knoblauch et al. | 426/419 X |
| 4,576,614 | 3/1986 | Armond et al. | 95/121 |
| 4,740,378 | 4/1988 | Jameson | 426/419 |
| 4,817,391 | 4/1989 | Roe et al. | 426/419 X |
| 4,829,774 | 5/1989 | Wassibauer et al. | 426/419 X |
| 4,845,958 | 7/1989 | Senda et al. | 426/418 X |
| 4,906,398 | 3/1990 | Alvarez et al. | 426/419 X |
| 4,961,322 | 10/1990 | Oguma et al. | 426/419 X |
| 4,976,944 | 12/1990 | Pacaud et al. | 95/116 X |
| 5,152,966 | 10/1992 | Roe et al. | 426/418 X |
| 5,249,428 | 10/1993 | Barbe et al. | 62/78 |

FOREIGN PATENT DOCUMENTS

| | | |
|---|---|---|
| 0294036 | 12/1988 | European Pat. Off. . |
| 50-063318 | 6/1978 | Japan . |
| 60-147240 | 8/1985 | Japan . |
| 62-246532 | 10/1987 | Japan . |
| 2171927 | 9/1986 | United Kingdom . |

OTHER PUBLICATIONS

Gellens et al., "On the Nature of the Charged Silver Clusters in Zeolites of Type A,X, and Y", *Zeolites*, Apr. 1981, vol. 1, pp. 11, 12, 85 and 86.

Y. Huang, "Ethylene Complexes in Coppper (1) and Silver (1) Zeolites", *Journal of Catalysis*, vol. 61, pp. 461–476 (1980).

H. Beyer et al., "Redox Behaviour of Transition Metal Ions in Zeolites", Journal of Chemical Science, (Faraday Trans 1), vol. 72(3), pp. 674–676 (1976).

*Primary Examiner*—Robert Spitzer
*Attorney, Agent, or Firm*—Coleman R. Reap; Larry R. Cassett

[57] ABSTRACT

A system for controlling the atmosphere of a container for use in the storage and/or transportation of perishable goods which includes adsorption apparatus for the selective adsorption in whole or in part and in a predetermined order of any water vapor, carbon dioxide, oxygen or ethylene contained within the atmosphere, a blower for urging the atmosphere to the adsorption apparatus, and a conduiting for returning the controlled atmosphere to the container.

26 Claims, 5 Drawing Sheets

STORAGE AND TRANSPORTATION OF GOODS UNDER CONTROLLED ATMOSPHERES

This is a continuation of application Ser. No. 08/055,941, filed May 3, 1993, now abandoned, which is a continuation of application Ser. No. 07/908,759 filed 1 Jul. 1992, now abandoned, which is a continuation of Ser. No. 07/731,679 filed 17 Jul. 1991, now abandoned, which is a continuation-in-part of Ser. No. 07/609,948 filed 6 Nov. 1990, now abandoned.

BACKGROUND OF THE INVENTION

This invention relates to the storage and transportation of goods and, more particularly, to the provision of atmospheres for the storage and transportation of perishable produce such as fruit, vegetables and flowers.

It is known that such perishable produce can be carried in refrigerated containers, sometimes known as "reefers", and refrigeration units for these containers have been developed to provide a reliable piece of apparatus which can usually function for long periods of time without maintenance.

It is also known that during storage and/or transportation the preservation of perishable produce can be enhanced by controlling the atmosphere surrounding the produce. The use in this respect of an atmosphere in which nitrogen (or other inert gas) predominates is particularly useful. Furthermore, in addition to controlling the amount of oxygen present in the atmosphere, there may be a need to control (but not necessarily eliminate) the amount of other substance which may be present, for example carbon dioxide and any ethylene which might be formed by the produce in situ in the container. In addition the level of water vapour in, ie. the humidity of, the atmosphere may be important; commonly, a relatively high humidity is required.

Although a variety of processes and systems have been proposed for the control of such atmospheres, there remains a need for a reliable system which can preferably be sufficiently compact so as to fit within the confines of a standard container or reefer and which can preferably be varied to suit the requirements of the different types of produce being stored and/or transported.

SUMMARY OF THE INVENTION

In accordance with the invention, there is provided a system for controlling the atmosphere of a container for use in the storage and/or transportation of perishable goods, which comprises:
- adsorption means for the selective adsorption (in whole or in part) and in a predetermined order of any water vapour, carbon dioxide, oxygen or ethylene contained within the atmosphere;
- means for urging the atmosphere to the adsorption means; and
- means for returning the controlled atmosphere to the container.

The word "container" as used herein includes not only individual containers or "reefers" but also enclosed parts of warehouses, ships' holds and the like.

The system can also have means for the addition to the atmosphere of nitrogen, carbon dioxide, water and/or ethylene from a separate source and/or may have means for returning to the atmosphere any or all of the adsorbed components from the atmosphere.

In some instances, the container may be initially flushed with an inert gas, especially nitrogen or a mixture of, for example, nitrogen and carbon dioxide, and the atmosphere control is begun on that basis to ensure that the desired amounts of water vapour, carbon dioxide, oxygen and ethylene are established either by the removal or the addition of these components (or both) by means of the system of the invention.

In other instances, the container may be initially filled with air and the atmosphere control is such that the system progressively reduces the oxygen content and thereby increases the nitrogen content of the atmosphere, whilst controlling the presence of carbon dioxide and water in particular also.

Preferably the adsorption means comprises a plurality of beds, each bed being designed preferentially to adsorb from the atmosphere one or more of water vapour, carbon dioxide, oxygen and ethylene. In preferred embodiments, separate beds are provided selectively to adsorb quantities of water vapour, ethylene, carbon dioxide and oxygen in that sequential order.

The system can advantageously be designed with beds operating on the basis either of pressure swing adsorption/desorption cycles or of temperature swing adsorption/desorption cycles or a combination of pressure swing and temperature swing cycles. Both such cycles are well documented in the art of air separation into its component oxygen and nitrogen parts in particular and the removal of water vapour and carbon dioxide from the air. In the first one, adsorption of a gas component of a mixture occurs at high pressure and desorption at lower pressures (including vacuum when appropriate). In the second, gases adsorbed at a lower temperature can be desorbed by raising the temperature, for example gases adsorbed at ambient temperatures can be desorbed at higher temperatures.

The adsorption means may also comprise a membrane atmosphere component of known type through which different atmosphere components will have different permeabilities.

A particular feature of systems including a pressure swing cycle is that a compressor, which generally must be employed to raise the pressure of the atmosphere prior to its entry into the pressure swing bed, can be employed wholly or in part to effect circulation of the atmosphere from the container, through the beds and back to the container.

With regard to the adsorbent materials used in the beds of the system, it is preferred:
- i) for water vapour adsorption, to use one of alumina or silica gel;
- ii) for carbon dioxide adsorption, to use a zeolite material, for example a zeolite of the 13X-type;
- iii) for ethylene adsorption, a zeolite material, for example a metal substituted NaY-type in which the zeolite ideally is copper, cobalt or silver substituted, with silver substitution being most preferred; and
- iv) for oxygen removal, to use a zeolite material which preferentially adsorbs nitrogen and to allow the non-adsorbed oxygen to vent from the system and the adsorbed nitrogen to be used for the controlled container atmosphere when desorbed from the zeolite, for example a 13X-type zeolite.

In preferred embodiments of the invention, the adsorption—in sequential order—of water vapour, ethylene, carbon dioxide and oxygen is expedient. Advantageously, the system can comprise:

a first bed containing alumina or silica gel for the preferential adsorption of water vapour and subsequent desorption of the water vapour on a temperature swing cycle basis a second bed containing a metal substituted NaY-type zeolite material for the preferential adsorption of ethylene and subsequent desorption of the ethylene on a temperature swing cycle basis a third bed containing a 13X-type zeolite material for the preferential adsorption of carbon dioxide and subsequent desorption of the carbon dioxide on a temperature swing cycle basis a fourth bed containing a 13X-type zeolite material for the preferential adsorption of nitrogen and subsequent desorption of the nitrogen on a pressure swing cycle basis.

One or more of the beds of a system of the invention may usefully be split into two (or more) separate portions wherein a first portion is designed to operate in an adsorptive mode whilst a second portion is designed to operate in a desorptive mode during each cycle of the bed.

Overall, therefore, systems of the invention are very flexible in use to achieve a controlled container atmosphere through one or more of:

i) the selective adsorption of certain atmosphere components ii) the selective return in whole or in part of adsorbed components to the container either directly or by reintroduction of adsorbed gases back into the atmosphere circulating within the system; this reintroduction can be by way of regenerating adsorbed gases with the produce gas of any part of the system iii) the introduction of desired atmosphere components, for example water vapour and carbon dioxide, from a source external of the system.

Systems in which:

i) at least a fraction of the product atmosphere of a one bed is designed to be used to desorb the adsorbate of that bed, or ii) at least a fraction of the product atmosphere of a one bed is designed to be used to desorb the adsorbate of another bed have been found to be useful.

In such systems, preferred options are those in which it is possible when desired that:

i) a fraction of the product atmosphere of the first portion of the bed designed to adsorb water vapour is employed to desorb the water vapour from the second portion of the bed and return at least some of the desorbed water to the container, and/or ii) a fraction of the nitrogen-rich gas desorbed from the second portion of the bed designed to adsorb nitrogen is employed to desorb the carbon dioxide from the second portion of the carbon dioxide bed and return at least some of the desorbed carbon dioxide to the container.

In preferred embodiments of the invention, the system is programmed to operate in different modes such that the amounts of one or more atmosphere components in the container can be increased or decreased in response to component detectors associated with the container.

For example, in a first mode the system could be programmed to provide a container atmosphere having a predetermined composition (or range of compositions) but that, when a detector reveals that one or more components are above or below that predetermined composition (or range), a second mode is adopted to adjust the composition.

Such adjustment in the different modes may employ any suitable means including the use of external gas sources, the reintroduction in whole or in part of adsorbed gases in the system or the manner in which the adsorbed gases are regenerated, for example by use of product gas from a bed of the system or otherwise.

Systems of the invention may also be programmed in a manner which allows for the predetermined composition (or range) in the container to be changed periodically and for that change to be effected by the adoption of a different mode of operation of the system.

For example, it may be expedient for a predetermined atmosphere to be used for an initial period for a particular purpose, for example to kill any insects or other pests present in the container or to destroy bacteria, etc, a normal storage/transportation atmosphere to be used thereafter but finally to adjust the atmosphere for the purpose of, for example, fruit ripening.

It may also be appropriate for other predetermined atmospheres to be used in other modes of operations, for example, to increase the oxygen content of the atmosphere in the event that an alcohol detector in the container revealed premature ripening of certain fruit, etc.

The use of temperature swing cycles for the adsorption/desorption of one or more components of a mixed atmosphere has been found to be particularly suitable for the control of a container atmosphere for use with perishable goods in particular. In accordance with a second aspect of the invention, there is provided a system for controlling the atmosphere of a container for use in the storage and/or transportation of perishable goods, which comprises removing or controlling at least one atmosphere component by selective adsorption of the component in a gas adsorbent material and thereafter effecting recirculation of the controlled atmosphere to the container, wherein means are provided for regeneration of the adsorbed gas from the material on a temperature swing cycle basis.

Advantageously, the container has refrigeration means associated with it and, in preferred embodiments, the invention can utilise the chilled gases to enhance adsorption and also can allow for the waste heat released by the refrigeration means, and by the condenser in particular, to be used in the temperature swing process by heating the adsorbent material to remove adsorbed gases and thereby to regenerate the adsorbent material.

It is also preferred for the recirculation fan means associated with the container refrigeration means to be employed to urge the container atmosphere to a gas separation unit incorporating the gas adsorbent material. In such cases, it is preferred for the atmosphere feed to the fan (being at a relatively lower pressure) to be positioned away from the atmosphere return to the container to avoid excessive recirculation through the adsorption system. Lateral displacement of the return relative to the feed is preferred.

Selective removal of each of the atmosphere components may be effected in a single bed of adsorbent material or, more usually, in a number of separate beds. Not all the beds in a multi-bed gas separation system need to be operated in a temperature swing basis and, indeed, in some instances it is preferred for these to be a system including PSA processes and TSA processes.

With regard to the adsorbent materials themselves for use in temperature swing cycles:

i) that employed for oxygen removal can usefully be a zeolite material, for example a 5A type zeolite. With such a material, nitrogen is the adsorbate and it is this adsorbate which, after regeneration of the material, is returnable to the container; regeneration can therefore be effected by means of container gas if appropriate. Alternatively, a carbon-molecular sieve may be employed but generally such adsorbents are not best suited to TSA regeneration because of the long cycle times employed.

ii) that employed for carbon dioxide removal can usefully be a 13X type zeolite molecular sieve which adsorbs the carbon dioxide, iii) that employed for ethylene can usefully be an alumina material (optionally, the same bed material can be used for the simultaneous adsorption of both ethylene and carbon dioxide) or a metal exchanged zeolite, for example a silver exchanged AgNaY.

iv) that employed for water vapour can usefully be an alumina material or silica gel.

In these cases of the particular beds referred to above, the zeolite material used for oxygen removal is less efficient if water or carbon dioxide are present in the feed gas. It is therefore preferred for a proportion of these two components to be removed prior to the feed into the oxygen zeolite bed.

Regeneration of the temperature swing beds can be effected by use of heated purge gases or, alternatively, by the presence of heaters within or around the bed itself, for example electrical heaters.

With regard to the construction of the container in all cases, the associated atmosphere control system can be fitted as an external or internal module or unit to a standard type container or alternatively can be included as an integral part of the container; each bed (or bed portion) may be contained as separate entities within the system; alternatively the adsorbent material of two or more beds (or bed portions) may be held adjacent each other in the system such that a gas mixture passing through a first material will automatically pass to the second material also. If appropriate, the bed or beds can be contained in long tubes shaped so that they can be readily fitted within the confines of the container (and/or the walls of the container) and to use, if necessary or appropriate, the insulation provided by the walls of the container. In this respect, it will be appreciated that the overall shape and size of the container (or reefer) is generally constructed to certain standard sizes worldwide.

If desired the systems could comprise releasable modules for fitting to or within the container such that they may be used in different containers or transported separately from the container itself.

The separation of ethylene from a gas mixture, which may be present albeit in small quantities because of its natural evolution from produce in the container, is generally critical to the adequate preservation of the produce in the container because its presence causes premature ripening of the produce or ageing of flowers. There are, however, difficulties in effecting its removal from gas mixtures in general and from ones in which nitrogen is a major constituent in particular. In accordance with a third aspect of the invention, there is provided a material for the preferential separation of ethylene from a gas mixture comprising a metal substituted NaY-type zeolite. A silver substituted NaY-type zeolite is most preferred. Such materials have generally been found to be useful in reducing levels of ethylene down to part per hundred million levels and to be especially effective in selectively removing ethylene from a nitrogen-containing gas mixture.

BRIEF DESCRIPTION OF THE DRAWINGS

For a better understanding of the invention various different systems of the invention will now be described and reference made, by way of exemplification only, to the accompanying drawings in which.

DETAILED DESCRIPTION OF THE INVENTION

Figure 1:
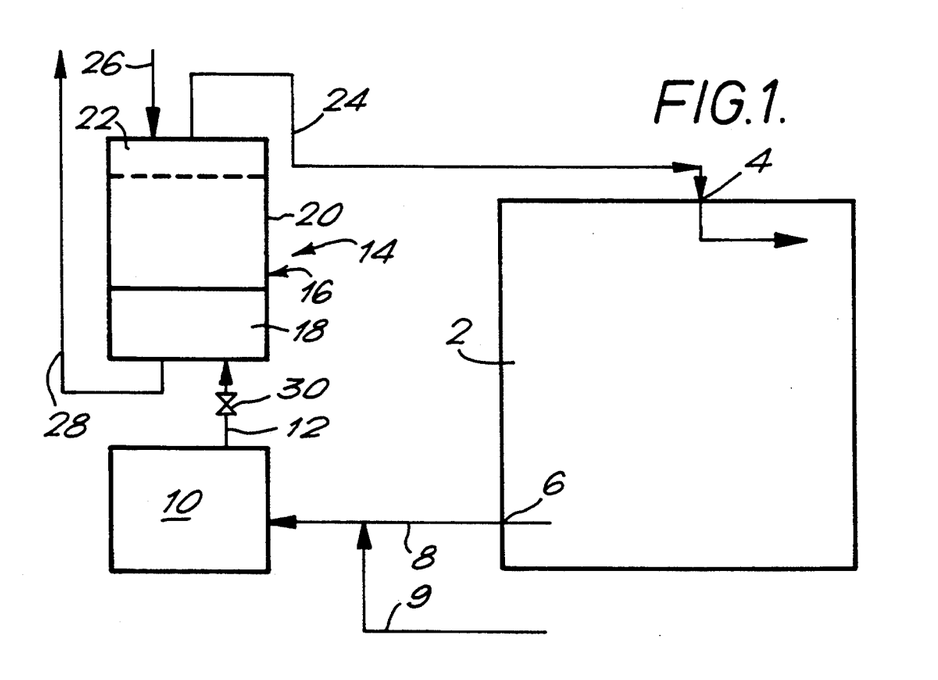
FIG. 1 is a schematic view of one embodiment of a system of the invention employing a pressure swing adsorption unit with one column.

Referring to the drawings and particularly to FIG. 1 there is shown an embodiment of the invention for controlling the atmosphere of perishable foodstuffs in which levels of the impurities oxygen, carbon dioxide, water vapour and especially ethylene are maintained within desirable limits to maximise conditions for storage and/or transportation.

Perishable foodstuffs, such as fruits and vegetables are stored in an enclosed environment such as a shipping container 2 having an inlet 4 and an outlet 6. The fruits and vegetables consume oxygen and emit carbon dioxide and ethylene during storage in an amount which if left uncontrolled will hasten spoilage. In accordance with the present invention, therefore, the container 2 is provided with a gaseous atmosphere having a predominant amount of an inert gas such as nitrogen or argon. (Although nitrogen will react with certain elements under particular conditions, the term "inert gas" as used herein includes nitrogen such as that obtained from the treatment of air by pressure swing adsorption).

A portion of the atmosphere in the container 2 is removed from the outlet 6 via a line 8 at about atmospheric pressure and ambient temperature. In a preferred form of the invention the feed stream passing through the line 8 is combined with "make-up" air from a line 9 according to need. The feed stream is then passed to a compressor 10 where the pressure of the feed stream is raised to a pressure sufficient to pass the feed stream through a pressure swing adsorption system as described hereinafter. Preferably, the pressure of the feed stream is raised to a pressure of from about 5 to 150 psig. The compressor 10 acts generally to effect circulation of the atmosphere from the container and to return the controlled atmosphere back to the container.

The compressed feed stream leaves the compressor 10 via a line 12 and a valve 30 and enters a pressure swing adsorption unit 14 having a single column 16 with two beds 18 and 20 and an optional third bed 22, as shown specifically in FIG. 1.

The first bed 18 of the column 16 contains a material adapted to remove water vapour from the feed stream. Examples of such materials include alumina and silica gel. In addition, or as an alternative, the bed 18 may contain a material effective for removing carbon dioxide alone or carbon dioxide and water vapour. Examples of such materials are zeolites, such as zeolite 13X and mordenites, alumina, carbon molecular sieve and activated carbon.

The feed stream then enters the second bed 20 containing an oxygen removing material. Examples of preferred materials for removing oxygen include molecular sieves, such as carbon molecular sieve. Oxygen adsorbers especially adapted for use in the second bed 20 may also remove carbon dioxide from the system.

If the amount of ethylene in the feed stream is within acceptable limits of no more than about one part per million (ppm), then the column 16 can be provided with only two beds 18 and 20 as described above. It is known, however, that fruits and vegetables generate ethylene in an autocatalytic reaction to the extent that the storage atmosphere often exceeds one ppm of ethylene, typically up to or exceeding 10 ppm. In this event, the column 16 is provided with a third bed 22 containing a selective zeolitic ethylene adsorber, preferably a metal substituted NaY type zeolite. Particularly preferred metals are copper, cobalt and silver substituted NaY type zeolites. The ethylene adsorber adsorbs ethylene preferentially over nitrogen in particular and thereby can be effective to reduce the ethylene content substantially, for example to no more than about one ppm.

The purified gas stream leaves the column 16 via a line 24 and is transmitted to the inlet 4 of the container 2. The amount of product gas provided to the container 2 should be sufficient to provide an atmosphere in the container preferably having an oxygen concentration of about 2 to 3%, a carbon dioxide concentration of about 2 to 5%, a relative humidity of at least 80% and no more than one ppm of ethylene.

The temperature in the container is preferably maintained in the range of from about minus 5° C. to about room temperature, most preferably about 5° C. The temperature is maintained within this range by a standard refrigeration unit (not shown).

The impurities accumulated within the beds 18, 20, 22 are removed and the beds regenerated in a conventional manner either at atmospheric pressure or under vacuum. For example, product gas from a separate source through a line 26 or as a side stream from the product gas in the line 24 is passed through the column 16. The impurity laden gas is then vented through a line 28.

In a single column system as shown in FIG. 1, the production of product gas must be terminated during the regeneration of the column 16. Thus the feed stream 12 is prevented from entering the column 16 by the stop valve 30 or other suitable means while the regeneration gas is supplied to the column 16.

The purified product gas emerging from the pressure swing adsorption unit 14 may contain an amount of water vapour less than may be desirable to maintain the freshness of the fruits and vegetables. In preferred embodiments of the invention, there is provided a system for adding water vapour to at least a portion of the gaseous product to raise the water vapour content and control it within a desirable range, typically at a relative humidity of at least about 80%.

Figure 2:
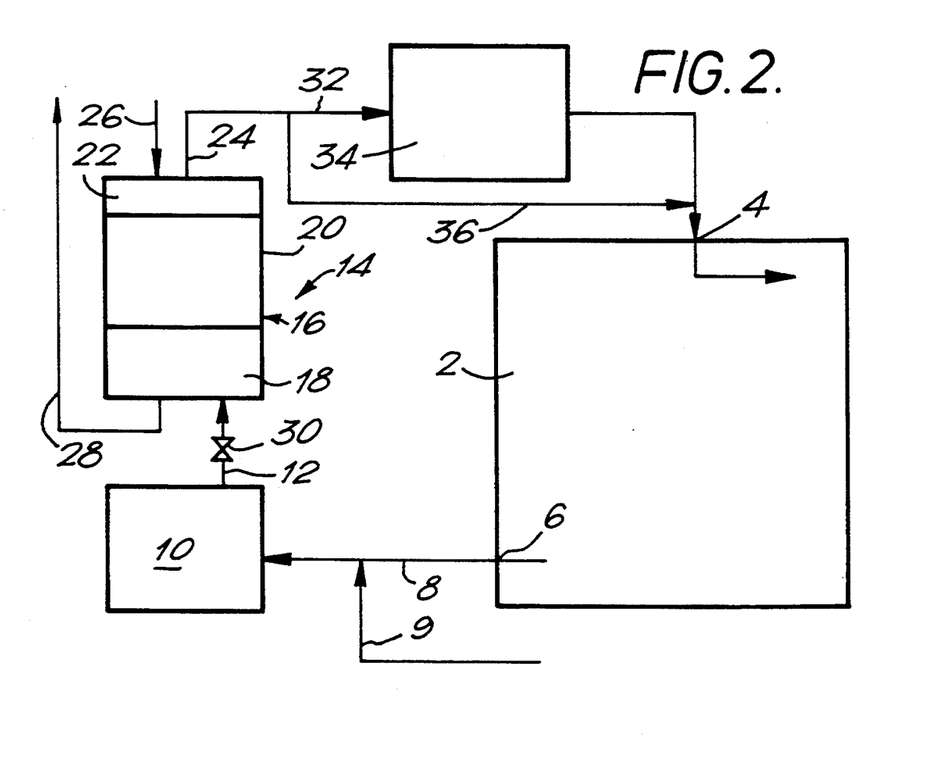
FIG. 2 is a schematic view of another embodiment of a system of the invention employing a single column pressure adsorption unit and a system for adding water vapour to the product gas.

Referring to FIG. 2, the feed stream from the container 2 is combined with "make-up" air supplied through the line 9 and the combined stream is compressed in a compressor 10 before proceeding via line 12 to the pressure swing adsorption unit 14 as described in connection with FIG. 1. The feed stream is passed through the same three bed 18, 20, 22 of the single column 16 pressure swing adsorption unit 14 to produce a product gas having substantially the same composition as that of FIG. 1.

The product gas flowing through the line 24 is then divided into two streams. One stream flows through a line 32 into a humidifier 34 adapted to raise the level of humidity in the feed stream of line 32 up to or near saturation levels. The second stream bypasses the humidifier 34 through a line 36 and combines with the humidified stream obtained from the humidifier 34 for entry into the inlet 4 of the container 2. The amount of water vapour in the humidified stream is controlled by controlling the amount of gaseous product entering the humidifier 34 to produce a combined stream having the required relative humidity, commonly at least 80%.

The system of the present invention can be operated continuously by employing a multiple column pressure swing adsorption unit with each column containing separate portions of bed material. In this embodiment of the invention, while at least one of the columns is generating product, at least one other column is undergoing regeneration to remove gas adsorbed therein.

Figure 3:
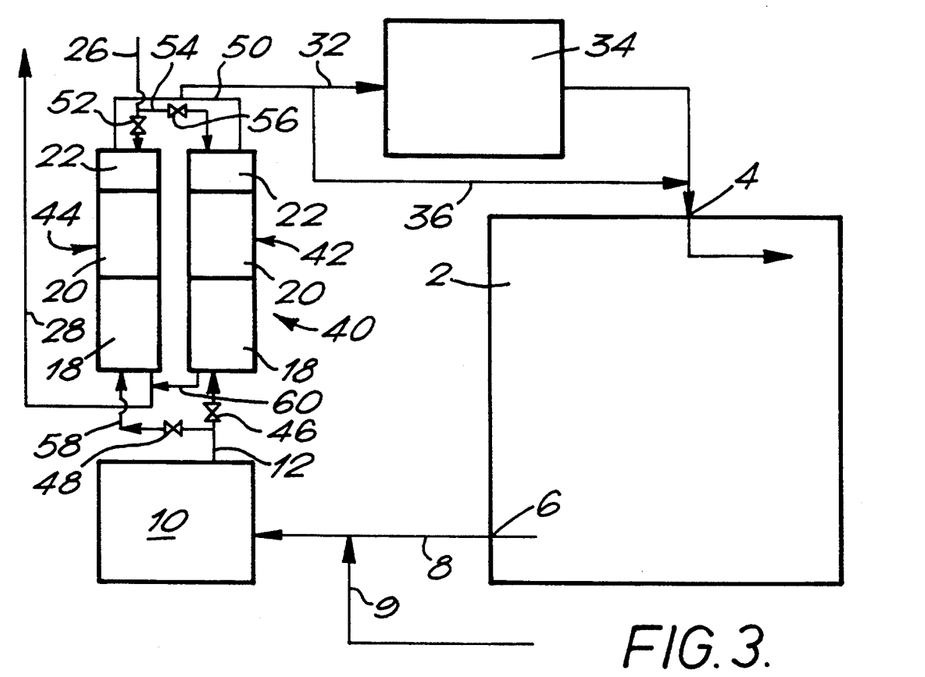
FIG. 3 is a schematic view of another embodiment of a system of the invention similar to that of FIG. 2 employing a pressure swing adsorption unit with multiple columns.

Referring to FIG. 3, the feed stream from the container 2 is compressed as previously described and sent via the line 12 to a double column pressure swing adsorption unit 40 comprising separate columns 42 and 44. (It should be understood, however, that the system may employ more than two columns.) While each column can have one or more beds, three beds 18, 20, 22 are shown as previously described in connection with FIG. 2. When one of the columns 42, 44 is producing product, the other of the columns is being regenerated to remove or return adsorbed gas.

By way of example, the feed stream flows through a stop valve 46 and into the column 42. At the same time, the stop valve 48 is turned off preventing the flow of the compressed feed stream to the other column 44. The feed stream proceeds through the beds 18, 20, 22 of the column 42 as described in the embodiment of FIG. 2. The product gas, containing essentially the same composition as previously described, exits the column 42 through a line 50 and into the line 32. Thereafter the purified gaseous product is optionally divided into streams 32 and 36 with the former passing through the humidifier 34 to add moisture to the product gas. The streams are thereafter combined so that the relative humidity is at least 80% and sent into the container 2 via the inlet 4.

While the column 42 is generating product gas, the column 44 is undergoing regeneration to remove adsorbed gases including oxygen, water vapour, carbon dioxide and ethylene. A purge gas having the same composition as the product gas (and which might indeed be a fraction of the product gas of column 42) is sent from a source (not shown) through the line 26 and the stop valve 52 into the column 44. The purge gas is prevented from entering the column 42 via the line 54 by a stop valve 56. The purge gas containing the regenerated gas obtained from the beds 18, 20, 22 is removed from the column 44 via the line 28.

When the column 42 becomes laden with adsorbed gases, the valve 46 is shut off and the feed stream is diverted from the line 12 through the valve 48 and into the column 44 via the line 58. At the same time the valve 52 is shut off and the purge gas is sent via the line 54 through the valve 56 to regenerate the column 42. The discharge is vented via the line 60 or transferred to the line 28 as specifically shown in FIG. 3.

The pressure swing adsorption units may comprise multiple vessels with at least one of the vessels containing separate beds of adsorbents and/or catalysts. In this embodiment, the impurities from one of the vessels may be recirculated to the product gas rather than being vented from the system.

Figure 4:
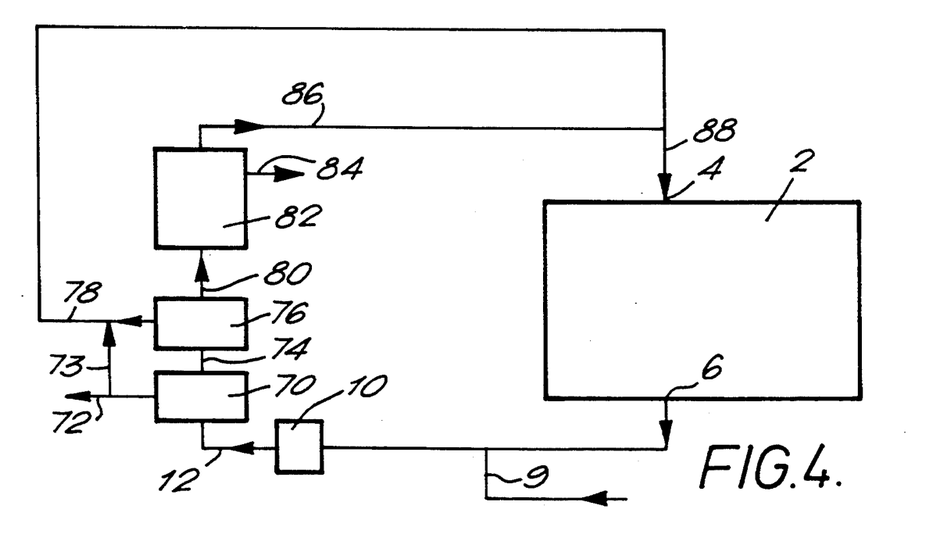
FIG. 4 is a schematic view of another embodiment of a system of the invention employing multiple columns with each column containing a different adsorbent/catalyst.

Referring to FIG. 4, the combined feed stream in line 6 is compressed in the compressor 10 and sent via the line 12 to a column 70 containing alumina or silica gel for adsorbing water vapour. The water vapour adsorbed therein is vented via a line 72 in a conventional manner or may pass through line 73 as hereinafter explained.

The gas obtained from the column 70 passes via a line 74 into a separate column 76 containing a carbon dioxide removing material, which as previously indicated may also remove water vapour. Examples of such materials include activated aluminas, zeolites, such as zeolite 13X, or mordenites. The carbon dioxide alone or including water vapour is discharged from the column 76 through a line 78 where it may be combined with water vapour from the line 73.

The combined impurity stream passes through the line 78 to the line 88 where it combines with product gas passing through a line 86 prior to entry into the container 2. In this embodiment the water vapour is recirculated to the product gas stream to raise the relative humidity of the product gas stream to a desirable level, commonly at least 80%. Accordingly, the humidifier 34 employed in the embodiments described in connection with FIGS. 2 and 3 may be eliminated.

The feed stream proceeds from the column 76 via the line 80 to a column 82 containing an oxygen removing adsorbent such as carbon molecular sieve and, optionally, an adsorbent that removes ethylene preferentially over nitrogen. Metal substituted Y type zeolites described in more detail below have been found to be advantageous for the removal of ethylene. The oxygen and ethylene adsorbed in the column 82 are vented via the line 84.

The purified product gas exits the column 82 through the line 86 where it combines with water vapour and carbon dioxide obtained from the column 76 and optionally column 70.

The removal of impurities and particularly ethylene may be accomplished using a temperature swing adsorption unit containing adsorbents, preferably an adsorbent which preferentially adsorbs ethylene over nitrogen.

Figure 5:
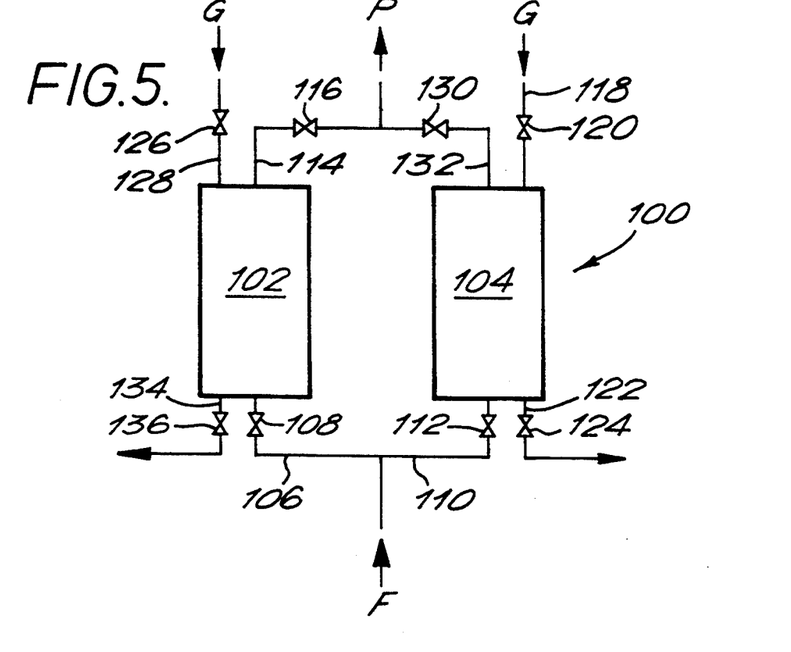
FIG. 5 is a partial schematic view of another embodiment of a system of the invention employing a temperature swing adsorption unit for the removal of ethylene.

Referring to FIG. 5, there is shown a temperature swing adsorption unit adapted to remove ethylene, preferably after the feed has been treated to adsorb other gases. More specifically, the feed stream obtained from a pressure swing adsorption unit 14 without the optional bed 22 of the embodiments shown in the previous Figures is fed via the line 24 to the temperature swing adsorption unit 100 shown in FIG. 5.

In FIG. 5, the unit 100 has two columns 102, 104 in which one column is alternately used to remove ethylene from the feed stream while the other column is regenerated to remove ethylene and other gases from the bed in a manner similar to the pressure swing adsorption unit 40 described in FIG. 3. It will be understood, however, that the temperature swing adsorption unit can also comprise a single column as described for the pressure swing adsorption unit 14 of FIG. 1.

In FIG. 5, the feed stream F obtained from a pressure swing adsorption unit, for example from line 24 in FIG. 1 or line 50 in FIG. 3, is decompressed and sent via a line 106 through a stop valve 108 into column 102. The feed is prevented from entering the other column 104 through a line 110 by turning off a valve 112. The column 102 is packed with a material adapted preferentially to remove ethylene from the treated feed stream. Metal substituted Y type zeolites described more fully below are preferred for this purpose.

The feed stream proceeds through the column 102 under cooling to a temperature of preferably from about $-40°$ C. to $+20°$ C. The feed stream, when it requires cooling, may be cooled by a conventional external means such as a heat exchanger or a refrigeration unit (not shown). Purified gas P, typically containing less than one ppm of ethylene, exits the column 102 via the line 114 and a stop valve 116 directly to the container as shown in FIG. 1 or (wholly or in part) through a humidifier as shown, for example, in FIG. 2.

While the column 102 is generating product gas, the column 104 is undergoing regeneration to remove adsorbed gases comprising mainly ethylene. A purge gas G which may have the same composition as the product gas (and which might indeed be a fraction of the product gas of column 42) is sent from a source (not shown) via a line 118 and a stop valve 120 into the column 104. Air or nitrogen can also be used as a purge gas. The temperature of the bed is raised to about $60°$ to $250°$ C. with a preheated gas through the line 118 or by an external heater (not shown). The adsorbed gases are evacuated from the column 104 through a line 122 and a stop valve 124. The purge gas is prevented from entering the column 102, during regeneration of the column 104, by closing a stop valve 126 thereby preventing the flow of the purge gas through a line 128.

When the column 102 becomes laden with adsorbed gas, the valve 108 is shut off and the feed stream is diverted through the line 110 and the stop valve 112 into the column 104. At the same time, the valves 116 and 120 are shut off, a valve 130 is opened so that product gas P formed in the column 104 can be obtained via a line 132. The purge gas G is then sent through the line 128 and the stop valve 126 to regenerate the column 102 with the discharge being vented via a line 134 and a stop valve 136.

Figure 6:
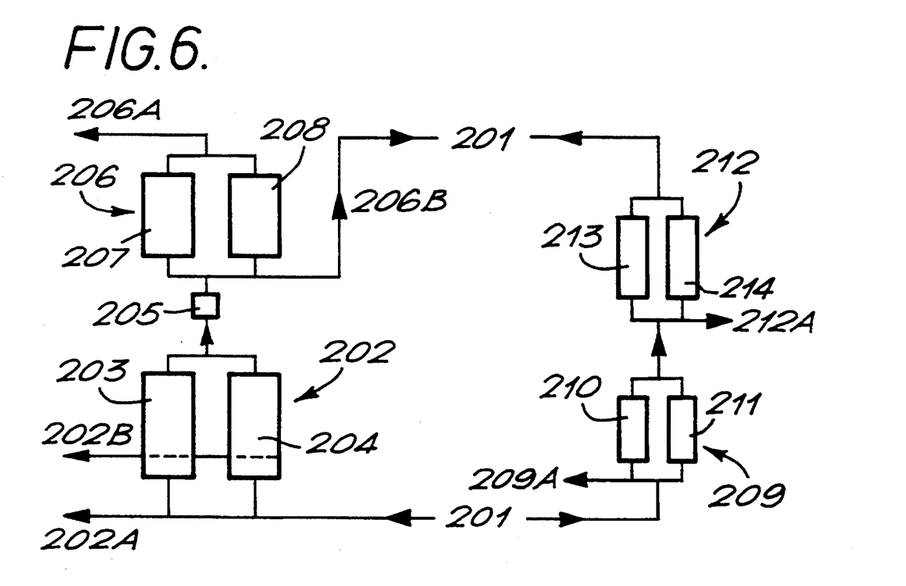
FIG. 6 is a schematic representation of another embodiment of a system of the invention employing both temperature swing adsorption units and a pressure swing adsorption unit.

Turning to FIG. 6, this shows a system employing both temperature swing and pressure swing adsorption units in the same system.

With reference to FIG. 6, there is shown a container 201 for the storage of produce which is initially filled with an atmosphere which comprises substantially nitrogen or alternatively the container 201 may initially comprise air. In the latter case, the time taken for the system to generate the required controlled atmosphere will be considerably greater in general than in the former case. Associated with the container 201 is a refrigeration means incorporating a compressor (not shown) for keeping the temperature of the produce typically at approximately 5° C.

Gas from the container, containing in addition to nitrogen, about 2.5% oxygen and 2 ppm ethylene and having a relative humidity of 90%, was continuously circulated in separate feeds:

i) to a double column arrangement 202 each column 203,204 of which contains separate beds of alumina (in the lower part) to remove water vapour and a zeolite (13X) (in the upper part) to adsorb carbon dioxide, operated on a TSA basis, and subsequently via a compressor 205 to a further double column arrangement 206 each column 207,208 of which contains a bed of a further zeolite to adsorb nitrogen, reject oxygen and provide nitrogen as a "vent" gas for return to the container 201, operated on a PSA basis, ii) to a double column arrangement 209 each column 210,211 of which contains a bed of alumina to remove water vapour, operated on a TSA basis and subsequently to a further double column arrangement 212 each column 213,214 of which contains a bed of a further zeolite (AgNaY) to adsorb ethylene, operated on a TSA basis, and the resultant gas returned to the container 201.

All four of the double column arrangements were operated with one column alternating between an adsorbing mode and a regenerating mode. The three temperature swing beds were cycled between about 0° C. and 100° C. in the above modes respectively, the cooling of the regenerated beds generally being effected by contact with cold feed gas and the heating of the bed being effected by use of the waste heat from the container refrigeration means. Alternative cooling means, for example cold water, may be used. In addition, alternative or supplementary heating means may also be employed.

Vented water vapour from double column 202 is shown by line 202A and vented carbon dioxide is shown by line 202B.

Vented oxygen from double column 206 is shown by line 206A and vented nitrogen (plus other remaining atmosphere components) being returned to the container 201 is shown by line 206B.

Vented water vapour from double column 209 is shown by line 209A.

Vented ethylene from double column 212 is shown by line 212A.

The atmosphere can be urged from the container into the above arrangements i) and ii) simultaneously and on a continuous basis by means of a recirculation fan associated with the container refrigeration means. Alternatively, in systems employing at least one pressure swing bed, the compressor normally associated with such beds can be employed to draw the atmosphere from the container and effect a general circulation of the atmosphere through the system.

Figure 7:
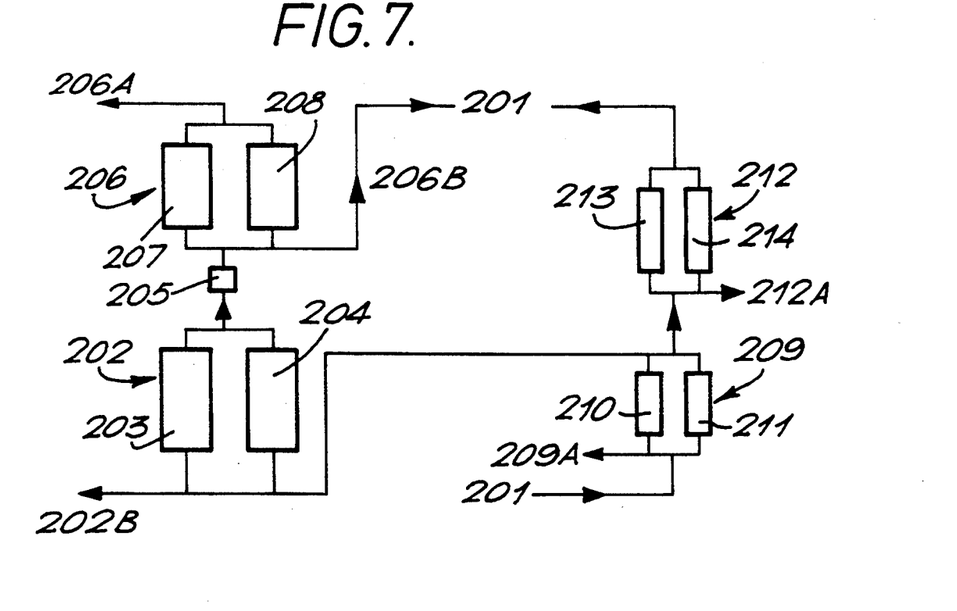
FIG. 7 is a schematic representation of a modified version of the embodiment of the system of FIG. 6.

A modified version of the system of FIG. 6 is shown in FIG. 7. The general arrangement is the same except for the fact that in the system of FIG. 7 the atmosphere drawn from the container 201 is all passed to the double column arrangement 209 to remove water vapour and is then split into two streams. One stream proceeds into arrangement 212 as in the system of FIG. 6. The other stream proceeds into a modified arrangement 202 whose columns 203,204 contain only a zeolite (BX) for adsorbing carbon dioxide.

Figure 8:
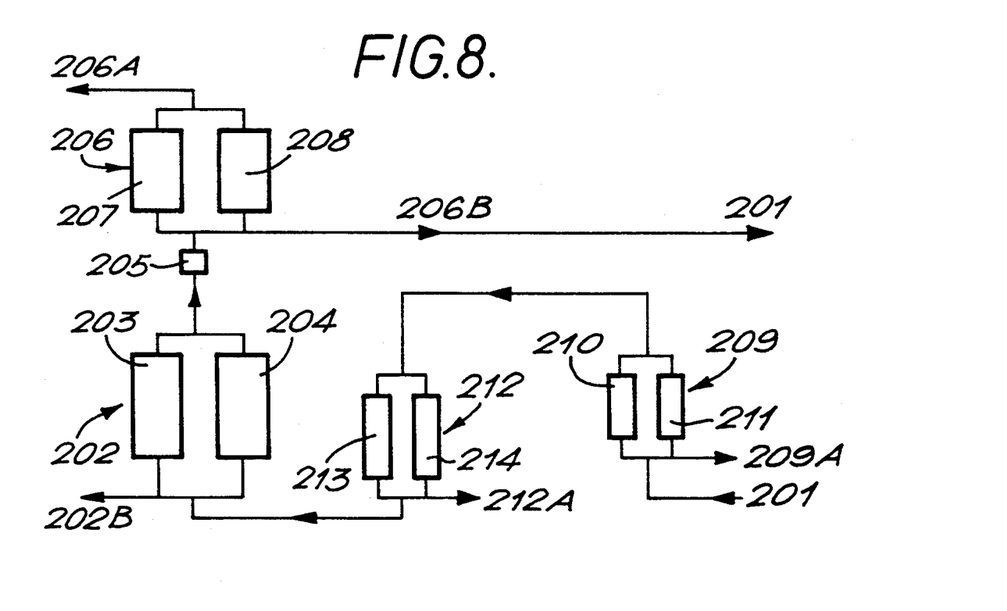
FIG. 8 is a schematic representation of a further modified version of the embodiment shown in FIGS. 6 and 7.

A further modified version of the system shown in FIG. 7 is shown in FIG. 8. Again using the same reference numerals/letters, FIG. 8 shows a system in which each of arrangements 209,212,202 and 206 are in series so that the atmosphere from the container 201 passes through each arrangement to remove water vapour, ethylene, carbon dioxide and oxygen in that sequential order.

In all the embodiments shown in FIGS. 6, 7 and 8 in particular and generally, systems of the invention employing double column arrangements for the bed(s) of adsorbent material must possess a plurality of valves to allow the temperature swing or pressure swing cycles to operate during use of the systems, especially to isolate one column from the atmosphere feed stream whilst the other column is being regenerated by desorption of the adsorbed atmosphere component. The valves may be any type normally used for such apparatus.

The capacity and size of any bed of the multi-bed systems of the invention will need to be varied from system to system depending on the number of factors including the mode of operation of the system, the anticipated composition of the initial atmosphere in the container and the desired final composition of the container atmosphere.

With regard to the flow of atmosphere around the system, this can be achieved in a number of different ways including:

a) the use of the fan associated with a refrigeration means for the container, b) the use of a compressor being used primarily to increase the pressure of atmosphere feed to a bed being operated on a pressure swing cycle basis; such a compressor may be situated at the inlet to a pressure swing operated bed or, alternatively, elsewhere in the system depending on the pressure requirements in any bed operated on a temperature swing cycle basis, and c) the use of any other fan or blower present in the system or any combination thereof.

Any "make-up" air which is required to replace the gases removed from the atmosphere being circulated around the systems of the invention may be introduced at any appropriate part of the system, for example between the container and a first bed of the system or, in the case of the systems shown in FIGS. 6, 7 and 8, in particular, prior to the feed into the compressor 205.

Systems of the invention provide the benefit of allowing flexibility in effecting regeneration of the different beds of the systems and also a variety of ways of controlling the resulting atmosphere in the container, for example, a complete or partial reintroduction of adsorbate gases from one bed into the feed stream for another bed or back to the container.

Such flexibility is important in being able to provide individually designed atmospheres to suit the particular produce being stored/transported in the container.

It has been found in particular, especially in relation to the system shown in FIGS. 6, 7 and 8 and generally, that air can be used to regenerate bed material in each case by removal of adsorbed gases during the relevant part of the cycle. However, although air is generally used in all cases for regeneration of ethylene from its bed, there are cases in which use of a product gas from a bed is useful for the regeneration of its own bed material or for the regeneration of adsorbent material in other beds.

For example, nitrogen gas produced for example in an oxygen/nitrogen separation bed can be used to regenerate adsorbed carbon dioxide from its bed and, optionally, to use the resulting nitrogen/carbon dioxide stream to regenerate water vapour from its bed; this is useful in cases in which it is desired to recirculate at least some of the adsorbed carbon dioxide and, optionally, water to the container.

Equally, a fraction of the dry atmosphere produced by the water vapour adsorbing bed may be used to regenerate the same bed; this is again useful in cases in which it is desired to recirculate at least some of the adsorbed water vapour back to the container. Alternatively, a fraction of the nitrogen gas product can be used to regenerate the water vapour bed in cases, for example, when it is desired to reject the carbon dioxide adsorbed and vent it from the carbon dioxide bed.

Figure 9:
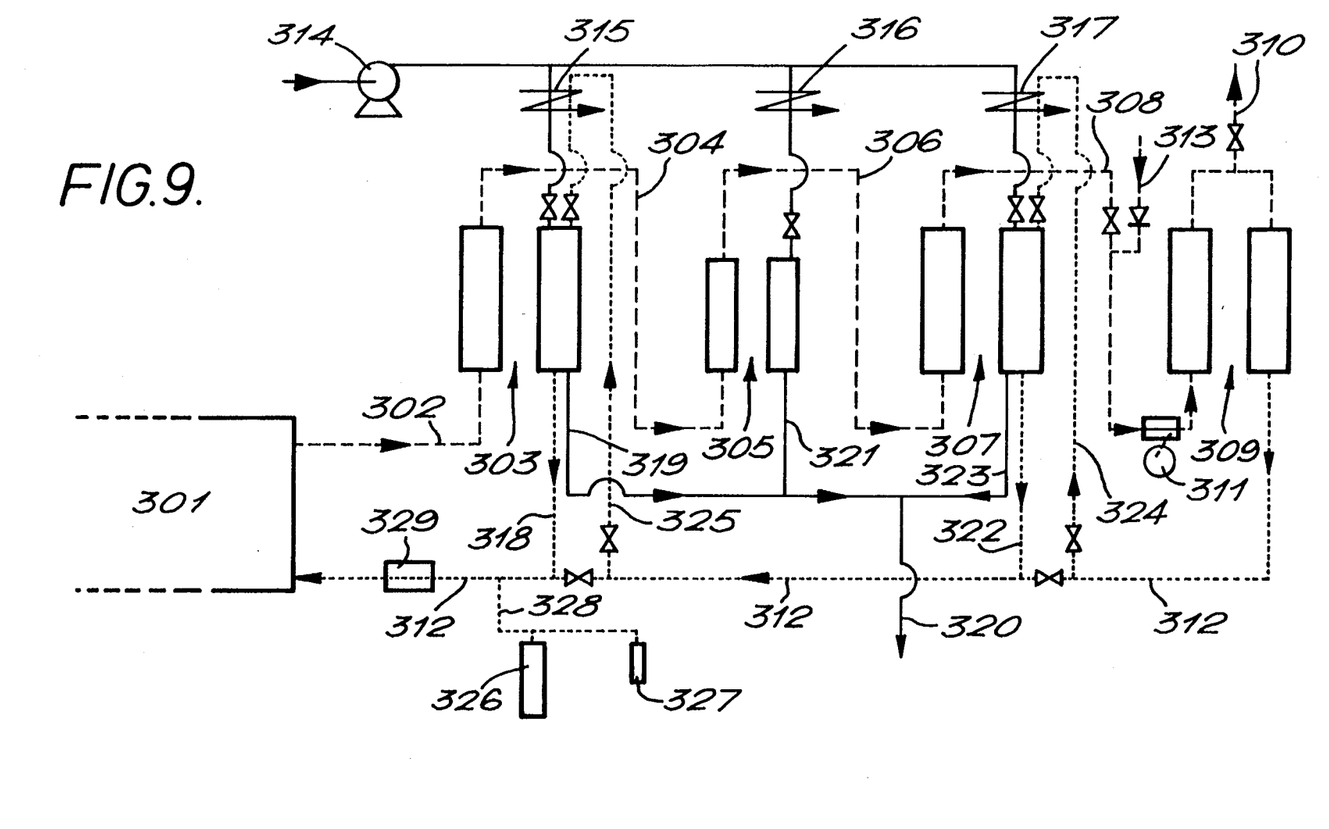
FIG. 9 is a schematic representation of a further system of the invention showing in particular different regeneration means for adsorbed gases.

Turning to FIG. 9, this shows a further system of the invention in which an atmosphere is circulated from and back to a container 301 through the system.

The atmosphere leaves the container 301 and proceeds i) via a line 302 proceeds to a first double bed 303 comprising alumina for the adsorption of water vapour using a temperature swing cycle between the beds, ii) then via a line 304 to a second double bed 305 comprising a silver substituted AgNaY zeolite for the adsorption of ethylene using a temperature swing cycle between the beds, iii) then via a line 306 to a third bed 307 comprising a 13X-type zeolite molecular sieve for the adsorption of carbon dioxide using a temperature swing cycle between the beds and, iv) then via a line 308 to a fourth bed 309 comprising a 13X-type zeolite using a pressure swing cycle between the beds.

In the fourth bed, the normally required product gas, nitrogen is adsorbed and an oxygen-rich stream exits the system via the line 310.

The first three beds operate at substantially normal atmosphere pressures, whereas the fourth bed 309 requires a compressor 311 to raise the pressure of the feed gas sufficiently to cause the adsorption of nitrogen in the pressure part of the cycle. This compressor 311 also has the function of driving the atmosphere around the system as a whole.

If it is desired, in a simple mode of operation of the system, to return the nitrogen rich stream obtained by desorption of the bed 309 back to the container 301, this can be effected via a line 312.

"Make-up" air to replace the oxygen in particular removed from the atmosphere can be introduced through the line 313.

Regeneration of the temperature swing beds 303, 305 and 307 can be effected in a number of ways.

Firstly, air can be blown by air blower 314 through one or more of these beds, the temperature of the air being controlled either by using the waste heat associated with container refrigeration means and/or by respective heaters 315, 316 and 317 so that the correct bed temperature for regeneration is obtained. Alternatively or separately, the beds themselves may be heated directly by means not shown.

Water regenerated in this way can pass via line 318 into line 312 and back to the container 310 or, more usually but depending on the required atmosphere in the container can pass via line 319 to waste gas stream 320.

Regenerated ethylene will pass via line 321 to the waste gas stream 320 as this is not generally required back in the container.

Regenerated carbon dioxide can pass via a line 322 back to the container 301 via the line 312 or, more usually, it can pass via a line 323 to the waste gas stream 320.

Secondly, in different modes of operation, nitrogen-rich gas desorbed from the bed 309 can be used to desorb one or both of the carbon dioxide bed 307 (via a line 324, the heater 317 and the line 322) and the water vapour bed 303 (via a line 325, the heater 315 and the line 318) and then in both cases rejoining the line 312 for return to the container 301.

In addition, supplementary supplies of carbon dioxide and ethylene, for example compressed in cylinders 326 and 327 respectively, are available for introduction to the system if needed via the line 328.

The complete valving for the system clearly is not shown. Equally FIG. 9 shows the system only in one part of the cycle for each of beds 303, 305, 307 and 309. Separate lines (not shown) are required for the other part of the cycles when the role of the separate portions of each bed is reversed.

Overall, the system can be programmed so that the different modes of operation can be brought into effect as necessary so that the required container atmosphere is attained. It is therefore very flexible.

If it is desired to increase the oxygen content of the atmosphere being returned to the container, for example in the event that the fruit (or whatever) is shown to be respiring at a high rate, this can be achieved by partially or fully closing the valve 330 in particular so that more air is drawn into the system via the line 313.

Finally, a refrigeration 329 is present to cool the atmosphere prior to it being returned to the container.

Various examples will now be described with reference to the preparation and use of zeolite material for the selective adsorption of ethylene in particular.

EXAMPLE 1

PREPARATION OF Co(II) NaY-ZEOLITE 50 g of pelletized NaY zeolite (manufactured by Union Carbide) having an average diameter of about 1/16 inch was ion exchanged with a 0.5M cobalt chloride solution at 90° C. for one hour. The resulting Co(II) NaY zeolite contained 14.7 weight % cobalt as a result of the ion exchange.

EXAMPLE 2

PREPARATION OF Cu(II) NaY-ZEOLITE 50 g of the pelletized NaY-zeolite described in Example 1 was ion exchanged with 0.1M copper nitrate in deionized water at room temperature for about 12 hours. The resulting Cu(II) zeolite was thoroughly washed with deionized water and dried for about 24 hours at 105° C. in an inert atmosphere. The material was then activated by heating at 400° C. under vacuum.

EXAMPLE 3

PREPARATION OF Ag(I) NaY ZEOLITE

The NaY zeolite described in Example 1 was ion-exchanged with a 0.1M silver nitrate solution at 90° C. for one hour. The resulting Ag(I) zeolite was thoroughly washed with distilled water, dried for 4 hours at 110° C. and then for 8 hours at 350° C.

The zeolites prepared in accordance with Examples 1–3 were placed in separate double column bench scale pressure swing adsorption units of the type shown and described in FIG. 3. Each column has a total capacity of 1.0 liters filled with 87.5% by volume of a carbon molecular sieve manufactured by the Kuraray Chemical Co. and 12.5% by volume of one of the ethylene adsorbents prepared above. A feed gas containing 50 ppm of ethylene in air was supplied to each column. The time of a full cycle was 120 seconds and was conducted at a pressure of 60 psig. The percent of ethylene rejected and the purity of the resulting nitrogen is shown in Table 1.

TABLE 1*

|  | Cu—NaY | Co NaY | Ag NaY |
|---|---|---|---|
| Ethylene Rejected (%) | 98.5% | 92.5% | 99.5% |
| Nitrogen Purity (% $O_2$ in stream) | 1.7% | 2.5% | 3.2% |

*Purge 0.8 liters/liter/cycle

The results shown in Table 1 indicate that the AgNaY zeolite is the most effective at removing ethylene. However, the amount of oxygen present in the final product is generally greater than with other metal substituted NaY type zeolites. For example, CuNaY zeolite obtains the highest purity product, but is not as effective in removing ethylene as AgNaY zeolites.

EXAMPLES 4–7

CoNaY ZEOLITE RUN

A double column pressure swing adsorption unit of the type shown in FIG. 3 was packed with 87.5% by volume carbon molecular sieve manufactured by Kuraray Chemical Co. and 12.5% by volume of CoNaY zeolite prepared as in Example 1. The total volume of the column was 2.0 liters.

A mixture containing 50 ppm of ethylene in air was fed to the pressure swing adsorption unit at an average bed pressure of 80 psig and a fixed equalization time of 4 seconds. Four runs were conducted at feed flow rates of 395 liters/hour, 405 liters/hour, 445 liters/hour and 465 liters/hour, respectively. The columns were purged with production nitrogen gas at the rate of 0.8 liter/minute. The full cycle of production and purge was 120 seconds. The concentration of ethylene in the product gas, percent of ethylene rejection and nitrogen yield are shown in TABLE 2.

TABLE 2

| CoNaY ZEOLITE RUN | | | | |
|---|---|---|---|---|
| Feed Rate liters/hour | Purge Rate liters/ liter/hour | Ethylene Conc. in Product (PPM) | % Ethylene Rejected | Nitrogen Yield (%) |
| 395 | 0.8 | 0.55 | 99.89 | 14.86 |
| 405 | 0.8 | 0.63 | 99.81 | 19.32 |
| 445 | 0.8 | 2.20 | 99.07 | 26.64 |
| 465 | 0.8 | 6.44 | 96.62 | 33.11 |

EXAMPLES 8–13

AgNaY ZEOLITE RUN

The process of Examples 4–7 was repeated using AgNaY zeolite prepared as described in Example 3. The results are shown in Table 3.

TABLE 3

| AgNaY ZEOLITE RUN | | | | |
|---|---|---|---|---|
| Feed Rate liters/hour | Purge Rate liters/ liter/hour | Ethylene Conc. in Product (PPM) | % Ethylene Rejected | Nitrogen Yield (%) |
| 400 | 0.8 | 0.04 | 99.99 | 14.86 |
| 415 | 0.8 | 0.13 | 99.96 | 18.92 |
| 445 | 0.8 | 0.24 | 99.90 | 26.11 |
| 470 | 0.8 | 0.34 | 99.82 | 32.95 |
| 480 | 0.8 | 0.40 | 99.77 | 36.19 |
| 510 | 0.8 | 0.51 | 99.63 | 45.00 |

EXAMPLE 14

A double column temperature swing adsorption unit of the type shown in FIG. 5 was packed with 200 g of AgNaY zeolite prepared as in Example 3. A mixture containing 2 ppm of ethylene and 2.5% oxygen in nitrogen was fed to the temperature swing adsorption unit at flow rates varying between 60 and 300 liters/hour. The full cycle time was varied between 4 and 8 hours, and consisted of two stages; during half cycle time, one of the beds was heated to a temperature of 100° C.

During the other half cycle, the bed was cooled down to a temperature of 0° C. and simultaneously, the gas mixture was fed to the bed. The concentration of ethylene rejection are shown in TABLE 4.

TABLE 4

| TEMPERATURE SWING ADSORPTION RUNS | | |
|---|---|---|
| Feed Rate liters/hour | Ethylene Conc. in Product (ppm) | % Ethylene Rejected |
| 60 | <0.05 | >97.5 |
| 120 | 0.1 | 95.0 |

EXAMPLE 15

COMPOSITION OF CONTAINER FEED

A 52.0 $m^3$ storage container housing 18.0 tons of Granny Smith apples, said container having a free volume of 20.0 $m^3$ is provided with an atmosphere at 90% relative humidity containing 2% by volume each of oxygen and carbon dioxide, less than 1 ppm of ethylene and the balance nitrogen. From about 3,000 to 15,000 liters/hour of gas from the container is combined with about 2,000 to 10,000 liters/hour of make up air at a temperature of about 20° C. having a relative humidity of about 50%.

The mixture is compressed at a pressure of between 20 and 150 psig and the compressed mixture is fed to a pressure swing adsorption unit in the system shown in FIG. 1. The pressure swing adsorption unit includes a first bed containing alumina for removing water vapour in an amount from about 1.2 to 5.0 liters.

A second bed containing from about 5 to 25 liters of zeolite 13X is used to adsorb carbon dioxide and additional amounts of water vapour. A third bed is provided for the removal of oxygen and ethylene which contains from about 10 to 50 liters of carbon molecular sieve and from about 1.5 to 6.0 liters of a silver exchanged NaY-type zeolite prepared in accordance with Example 3.

After treatment in the pressure swing adsorption unit, the stream returning to the container has the composition shown in Table 5.

TABLE 5

| COMPOSITION OF CONTAINER FEED | |
|---|---|
| Nitrogen | 95.66% by volume |
| oxygen | 1.80% by volume |
| carbon dioxide | 1.95% by volume |
| ethylene | 0.48 ppm |
| water | 0.74% by volume |

EXAMPLE 16

A storage container having the same volume as described in Example 15 and housing 18.0 tons of Anaheim chilli peppers is provided with an atmosphere at 90% relative humidity containing 2% by volume of each of oxygen and carbon dioxide, less than 0.2 ppm ethylene and the balance nitrogen.

About 1,000 to 5,000 liters/hour of gas from the container is combined with about 1,000 to 5,000 liters/hour of make up air at about 20° C. having a relative humidity of about 50%.

The mixture is compressed at a pressure of from about 5 and 150 psig and the compressed mixture is fed to a pressure swing adsorber having the same structure and materials as described in connection with Example 15.

Approximately one third of the resulting feed stream is sent to a humidifier as shown in FIG. 2 operating at about 90% relative humidity. The humidified stream is combined with the remaining product gas leaving the pressure swing adsorption unit to provide a stream to the container having the composition shown in Table 6.

TABLE 6

| nitrogen | 97.668% by volume |
|---|---|
| oxygen | 1.6% by volume |
| carbon dioxide | 0.032% by volume |
| ethylene | 0.04 ppm |
| water | 0.7% by volume |

We claim:

1. A process for removing one or more impurities from the atmosphere of a container during the storage and/or transportation of perishable goods therein comprising, as sequential steps:

(a) adsorbing water vapor from the atmosphere in a first adsorption zone containing as adsorbent alumina or silica gel, thereby producing as nonadsorbed product water vapor-depleted atmosphere, (b) adsorbing ethylene from the water vapor-depleted atmosphere in a second adsorption zone containing a type Y zeolite adsorbent at least partially substituted with copper, cobalt or silver, thereby producing as non-adsorbed product an atmosphere depleted in water vapor and ethylene, (c) adsorbing carbon dioxide from the water vapor- and ethylene-depleted atmosphere in a third adsorption zone containing a zeolite adsorbent, thereby producing as non-adsorbed product an atmosphere depleted in water vapor, ethylene and carbon dioxide, (d) passing said atmosphere depleted in water vapor, ethylene and carbon dioxide through a fourth adsorption zone containing a zeolite adsorbent selective for adsorption of nitrogen, thereby producing as non-adsorbed product oxygen-rich gas, and desorbing sorbed gas from said fourth adsorption zone on a pressure swing cycle basis, thereby producing nitrogen-rich atmosphere, and (e) recycling said nitrogen-rich atmosphere to said container.

2. A process according to claim 1, further comprising at least partially regenerating the fourth adsorption zone with nonadsorbed product gas from the fourth adsorption zone.

3. A process according to claim 1, further comprising at least partially regenerating at least one of said first or third adsorption zones with said nitrogen-rich atmosphere and recycling to said container the gases desorbed from these adsorption zones.

4. A process according to claim 1, further comprising at least partially regenerating at least one of the first, second and third adsorption zones with air and venting the gases desorbed from these zones to the atmosphere.

5. A process according to claim 1, further comprising operating the first, second and third adsorption zones on temperature swing adsorption cycles.

6. A process according to claim 5, further comprising operating the fourth adsorption zone on a pressure swing adsorption cycle.

7. A process according to claim 1, further comprising operating the fourth adsorption zone on a pressure swing adsorption cycle.

8. A process according to claim 1, wherein the atmosphere originally present in said container comprises substantially air and the system progressively increases the nitrogen content and decreases the oxygen content of the atmosphere.

9. A process according to claim 1, wherein the type Y zeolite is substituted with silver.

10. A process according to claim 9, wherein the adsorbent in said third and fourth adsorption zones is type 13X zeolite.

11. A process according to claim 1, wherein the adsorbent in said third adsorption zone is type 13X zeolite.

12. A process according to claim 1, wherein the adsorbent in said fourth adsorption zone is type 13X zeolite.

13. A system for controlling the concentration of gaseous components in the atmosphere of a container during the storage and/or transportation therein of perishable goods, which comprises:

a first adsorption zone having a feed inlet, a nonadsorbed product gas outlet and a desorbed product gas outlet, containing as adsorbent alumina or silica gel, a second adsorption zone having a feed inlet, a nonadsorbed product gas outlet and a desorbed product gas outlet, containing a type Y zeolite adsorbent substituted with copper, cobalt or silver, a third adsorption zone having a feed inlet, a nonadsorbed product gas outlet and a desorbed product gas outlet, containing a zeolite adsorbent, a fourth adsorption zone having a feed inlet, a nonadsorbed product gas outlet and a desorbed product gas outlet, containing a zeolite adsorbent, conduit means providing fluid communication between: said container and the inlet to said first adsorption zone; the nonadsorbed product gas outlet of said first adsorption zone and the inlet to said second adsorption zone; the nonadsorbed product gas outlet of said second adsorption zone and the inlet to said third adsorption zone; the nonadsorbed product gas outlet of said third adsorption zone and the inlet to said fourth adsorption zone; and the desorbed product gas outlet of said fourth adsorption zone and said container, and means for urging the atmosphere from said container, sequentially through said first, second, third and fourth adsorption zones, and back to said container via said conduit means.

14. A system according to claim 13 in which the zeolite in said second adsorption zone is silver substituted.

15. A system according to claim 13 in which one or more of the adsorption zones is split into two (or more) separate portions wherein a first portion is designed to operate in an adsorptive mode whilst a second portion is designed to operate in a desorptive mode during each cycle of the adsorption zone.

16. A system according to claim 13 in which the container has refrigeration means associated with it.

17. A system according to claim 16 further comprising means for regenerating the adsorbent in at least one of said first, second, third or fourth adsorption zones with waste heat released by the refrigeration means during regeneration of the adsorbent.

18. A system according to claim 17 in which a fan associated with the refrigeration means is employed to urge the container atmosphere to said first adsorption zone.

19. A system according to claim 13, wherein the adsorbent in at least one of said third and fourth adsorption zones is type 13 X zeolite.

20. A system according to claim 19, wherein the adsorbent in said second adsorption zone is silver-substituted type Y zeolite.

21. A system according to claim 13, further comprising means for regenerating the fourth adsorption zone with nonadsorbed product gas from the fourth adsorption zone.

22. A system according to claim 13, further comprising means for regenerating the first adsorption zone, the third adsorption zone or both of these with desorbed product gas from the fourth adsorption zone, and means for recycling the gases desorbed from these zones to said container.

23. A system according to claim 13, further comprising means for regenerating at least one of the first, second and third adsorption zones with air and venting the gases desorbed from these zones to the atmosphere.

24. A system according to claim 13, further comprising means for regenerating the first, second and third adsorption zones on temperature swing adsorption cycles.

25. A system according to claim 24, further comprising means for regenerating the fourth adsorption zone on a pressure swing adsorption cycle.

26. A system according to claim 13, further comprising means for regenerating the fourth adsorption zone on a pressure swing adsorption cycle.

* * * * *